(12) United States Patent
Accapadi et al.

(10) Patent No.: US 9,122,534 B2
(45) Date of Patent: *Sep. 1, 2015

(54) SECURE APPLICATION PARTITIONING ENABLEMENT

(71) Applicant: International Business Machines Corporation, Armonk, NY (US)

(72) Inventors: Jos M. Accapadi, Austin, TX (US); Andrew Dunshea, Austin, TX (US); Lynne M. Weber, Austin, TX (US); Linda A. Zimmer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 242 days.

This patent is subject to a terminal disclaimer.

(21) Appl. No.: 13/862,990

(22) Filed: Apr. 15, 2013

(65) Prior Publication Data

US 2013/0232502 A1 Sep. 5, 2013

Related U.S. Application Data

(63) Continuation of application No. 11/935,585, filed on Nov. 6, 2007, now Pat. No. 8,424,078.

(51) Int. Cl.
*G06F 9/50* (2006.01)
*G06F 12/00* (2006.01)
(Continued)

(52) U.S. Cl.
CPC ............. *G06F 9/5061* (2013.01); *G06F 21/53* (2013.01); *G06F 21/80* (2013.01)

(58) Field of Classification Search
CPC ........ G06F 21/53; G06F 21/80; G06F 9/5061

USPC .................................. 726/17; 711/153, 173
See application file for complete search history.

(56) References Cited

U.S. PATENT DOCUMENTS

| 5,659,786 A | 8/1997 | George et al. |
| 5,784,702 A | 7/1998 | Greenstein et al. |

(Continued)

FOREIGN PATENT DOCUMENTS

| JP | 2002014909 A | 1/2002 |
| JP | 2004070935 A | 3/2004 |

(Continued)

OTHER PUBLICATIONS

CIGAR: Application Partitioning for a CPU/Coprocessor Architecture; Kelm et al, IEEE, Sep. 15-19, 2007.*

(Continued)

*Primary Examiner* — Luu Pham
*Assistant Examiner* — Jahangir Kabir
(74) *Attorney, Agent, or Firm* — Yee & Associates, P.C.; Parashos T. Kalaitzis

(57) ABSTRACT

A computer implemented method, data processing system, and computer program product for configuring a partition with needed system resources to enable an application to run and process in a secure environment. Upon receiving a command to create a short lived secure partition for a secure application, a short lived secure partition is created in the data processing system. This short lived secure partition is inaccessible by superusers or other applications. System resources comprising physical resources and virtual allocations of the physical resources are allocated to the short lived secure partition. Hardware and software components needed to run the secure application are loaded into the short lived secure partition.

18 Claims, 8 Drawing Sheets

(51) Int. Cl.
*G06F 13/00* (2006.01)
*G06F 21/53* (2013.01)
*G06F 21/80* (2013.01)

(56) References Cited

U.S. PATENT DOCUMENTS

| | | | |
|---|---|---|---|
| 6,594,743 B1* | 7/2003 | Chen et al. | 711/162 |
| 6,633,963 B1 | 10/2003 | Ellison et al. | |
| 6,986,137 B1 | 1/2006 | King et al. | |
| 7,140,020 B2 | 11/2006 | McCarthy et al. | |
| 7,146,640 B2* | 12/2006 | Goodman et al. | 726/16 |
| 7,272,832 B2 | 9/2007 | Gardner | |
| 7,478,246 B2 | 1/2009 | Arndt et al. | |
| 7,484,247 B2 | 1/2009 | Rozman et al. | |
| 7,509,644 B2 | 3/2009 | Worley, Jr. | |
| 7,565,398 B2 | 7/2009 | Ashok et al. | |
| 7,693,838 B2 | 4/2010 | Morgan et al. | |
| 7,698,529 B2 | 4/2010 | Accapadi et al. | |
| RE43,103 E | 1/2012 | Rozman et al. | |
| 8,424,078 B2* | 4/2013 | Accapadi et al. | 726/17 |
| 2002/0107977 A1 | 8/2002 | Dunshea et al. | |
| 2002/0157010 A1 | 10/2002 | Dayan et al. | |
| 2003/0037092 A1 | 2/2003 | McCarthy et al. | |
| 2003/0101322 A1* | 5/2003 | Gardner | 711/163 |
| 2003/0135350 A1* | 7/2003 | Cheston et al. | 702/186 |
| 2004/0003063 A1 | 1/2004 | Ashok et al. | |
| 2004/0111578 A1* | 6/2004 | Goodman et al. | 711/163 |
| 2004/0177342 A1 | 9/2004 | Worley, Jr. | |
| 2006/0026419 A1 | 2/2006 | Arndt et al. | |
| 2006/0031940 A1* | 2/2006 | Rozman et al. | 726/27 |
| 2007/0112772 A1 | 5/2007 | Morgan et al. | |
| 2007/0136721 A1 | 6/2007 | Dunshea et al. | |
| 2007/0288941 A1 | 12/2007 | Dunshea et al. | |
| 2008/0168457 A1 | 7/2008 | Accapadi et al. | |
| 2009/0118839 A1 | 5/2009 | Accapadi et al. | |

FOREIGN PATENT DOCUMENTS

| | | |
|---|---|---|
| JP | 2007506169 A | 3/2007 |
| JP | 2007524896 A | 8/2007 |
| JP | 2007531308 A | 11/2007 |
| JP | 2008508417 A | 3/2008 |
| WO | WO2009059962 A1 | 5/2009 |

OTHER PUBLICATIONS

Memoization Attacks and Copy Protection in Partitioned Applications, O'Donnell et al, IEEE, Jun. 20-22, 2007.*
International Search Report and Written Opinion, dated Feb. 3, 2009, regarding Application No. PCT/EP2008/064916 (WO2009059962), 10 pages.
Chinese Office Action with English Translation, dated Jul. 12, 2012, regarding Application No. 200880114892.0 (CN101849225), 18 pages.
Office Action dated Dec. 23, 2010, regarding U.S. Appl. No. 11/935,585, 21 pages.
Final Office Action dated May 13, 2011, regarding U.S. Appl. No. 11/935,585, 22 pages.
Office Action dated Feb. 29, 2012, regarding U.S. Appl. No. 11/935,585, 12 pages.
Notice of Allowance dated Dec. 10, 2012, regarding U.S. Appl. No. 11/935,585, 15 pages.

* cited by examiner

SECURE APPLICATION PARTITIONING ENABLEMENT

This application is a continuation of U.S. patent Ser. No. 11/935,585, filed Nov. 6, 2007.

BACKGROUND OF THE INVENTION

1. Field of the Invention

The present invention relates generally to an improved data processing system, and in particular to a computer implemented method, data processing system, and computer program product for configuring a partition with needed system resources to enable an application to run and process in a secure environment.

2. Description of the Related Art

A logical partitioned functionality within a data processing system allows multiple copies of a single operating system or multiple heterogeneous operating systems to be simultaneously run on a single data processing system platform. A partition, within which an operating system image runs, is assigned a non-overlapping subset of the platform's resources. These platform allocatable resources include one or more architecturally distinct processors with their interrupt management area, regions of system memory, and input/output (I/O) devices. An operating system may be installed on the disk drives, such that each logical partition (LPAR) runs as an independent server with the processor, memory, and input/output resources allocated to the partition. The partition's resources are represented by the platform's firmware to the operating system image.

Configuring logical partitions with the system resources needed to run an application on the partition currently requires a system administrator to configure and maintain these configurations. A system administrator connects to the system being configured or managed through a hardware management console (HMC). A hardware management console is a hardware terminal that connects to the server firmware. This terminal allows an administrator to make hardware configurations, install operating systems, applications, and configure software for the logical partitioned data processing system. The elements in configuring logical partitioned systems include, but are not limited to, network information, the size and amount of disks which may be physical or virtual, and Ethernet adapters. The network configuration information includes, for example, the Internet Protocol (IP) address, a subnet mask, and a default gateway.

Currently, to set up a data processing system having partitions for specific operating environments, the system administrator uses the hardware management console to create specific partitions for specific operating environments, as well as allocate specific system resources to the partitions. Alternatively, the system administrator may use the hardware management console to set up dynamic logical partitioning, wherein the specific system resources for a partition may be allocated dynamically based on the configuration set up by the system administrator. A drawback to the current logical partitioning method is that the partitions must be set up prior to runtime and preconfigured with the necessary allocations or system resources. Thus, if an application is placed on the data processing system, the application must operate under the constraints of these preconfigured resource allocations.

SUMMARY OF THE INVENTION

The illustrative embodiments provide a computer implemented method, data processing system, and computer program product for configuring a partition with needed system resources to enable an application to run and process in a secure environment. Upon receiving a command to create a short lived secure partition for a secure application, a short lived secure partition is created in the data processing system. This short lived secure partition is inaccessible by superusers or other applications. System resources comprising physical resources and virtual allocations of the physical resources are allocated to the short lived secure partition. Hardware and software components needed to run the secure application are loaded into the short lived secure partition.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
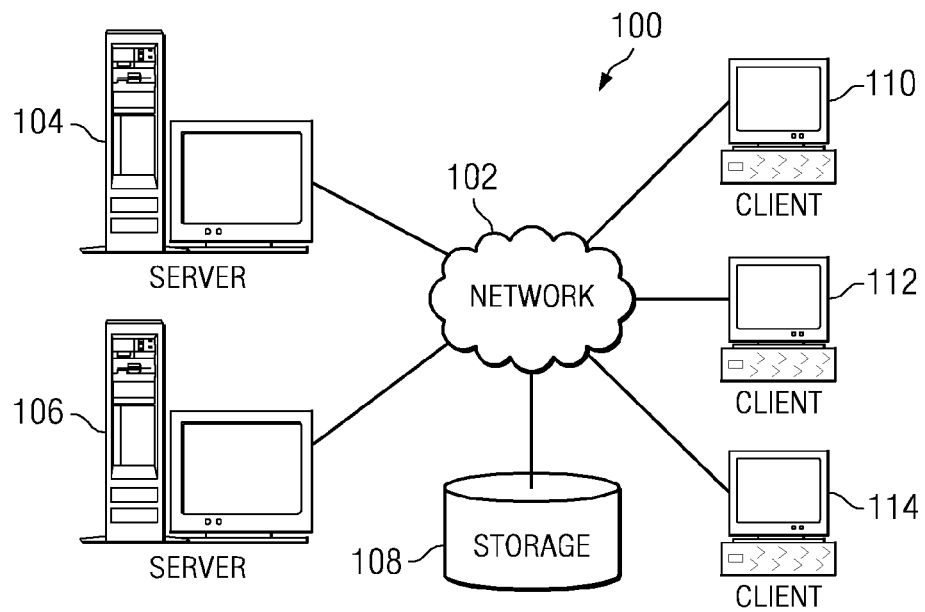
FIG. 1 depicts a pictorial representation of a distributed data processing system in which the illustrative embodiments may be implemented.
Figure 2:
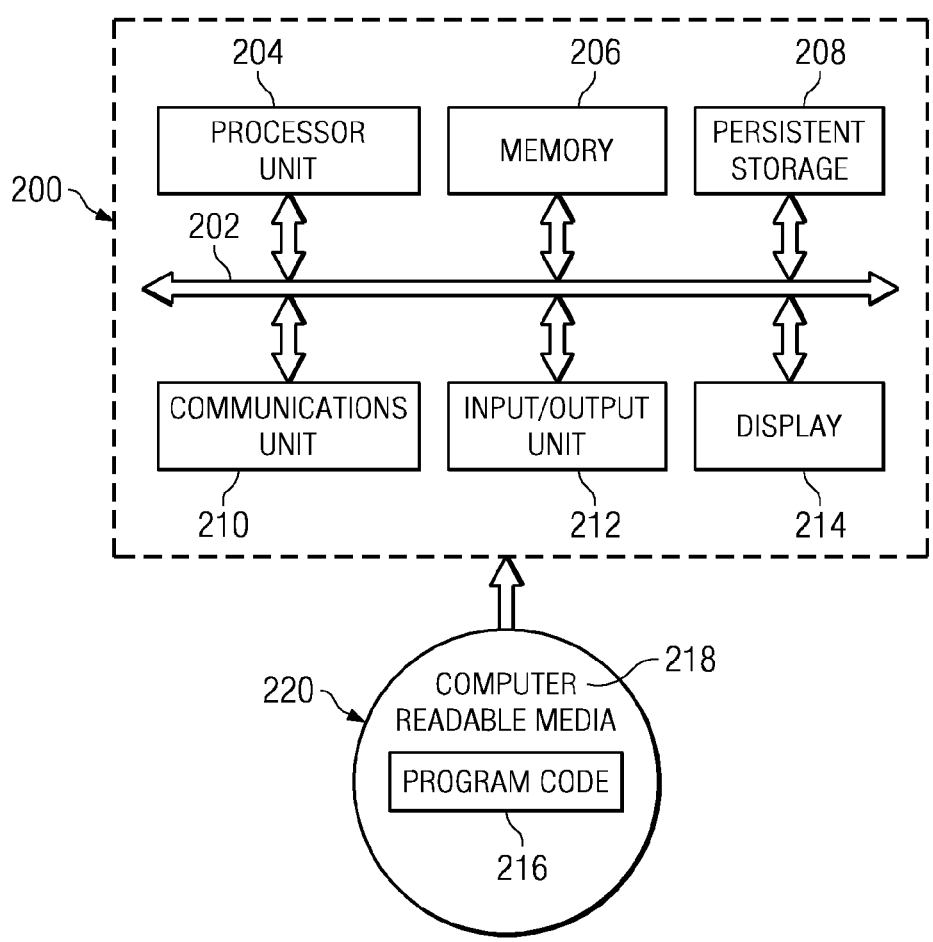
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as, program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media x18 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
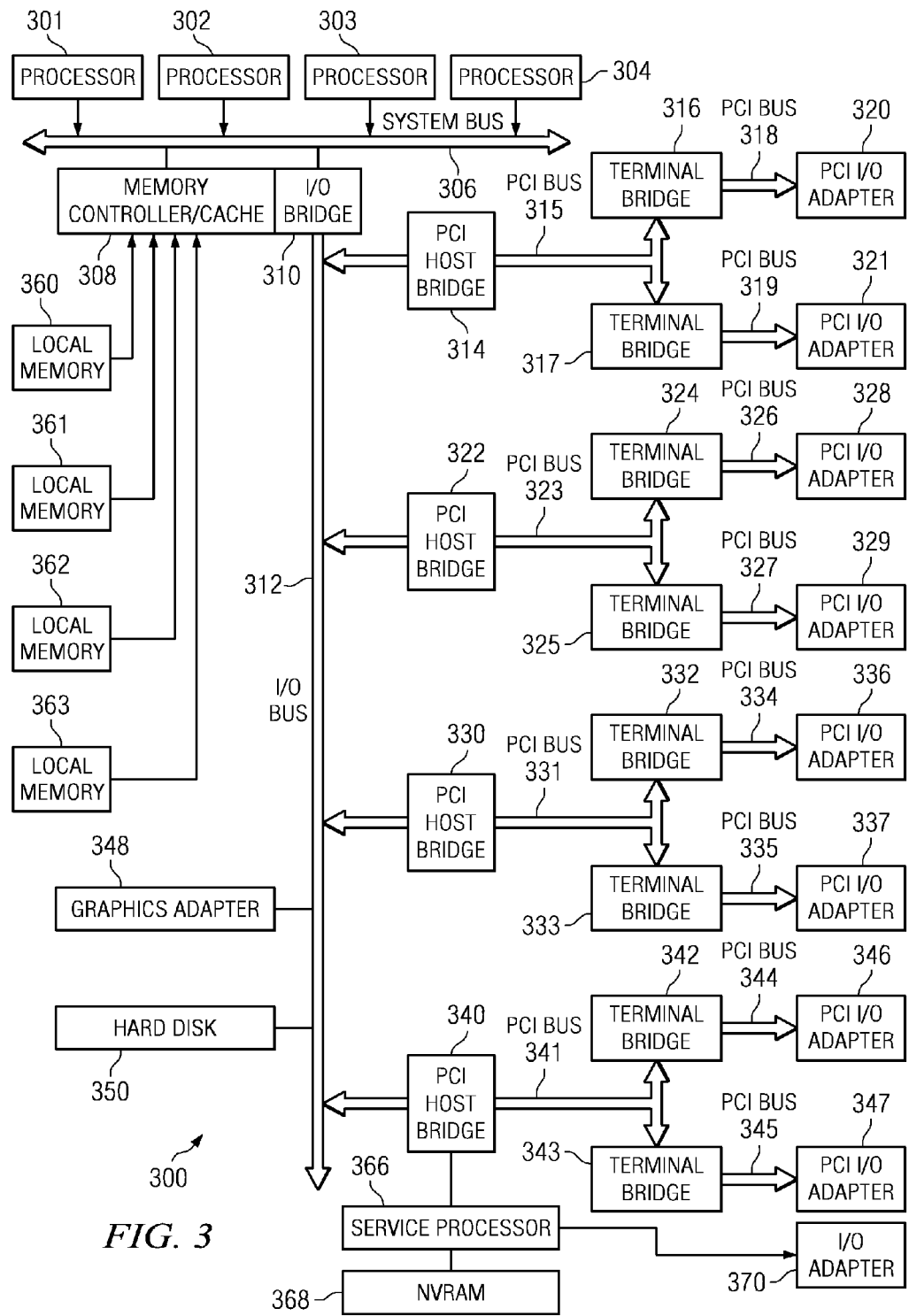
FIG. 3 is a block diagram of a data processing system, which may be implemented as a logically partitioned server.

With reference now to FIG. 3, a block diagram of a data processing system, which may be implemented as a logically partitioned server, such as server 104 in FIG. 1, is depicted in accordance with the present invention. Data processing system 300 may be a symmetric multiprocessor (SMP) system including a plurality of processors 301, 302, 303, and 304 connected to system bus 306. Alternatively, a single processor system may be employed. Also connected to system bus 306 is memory controller/cache 308, which provides an interface to a plurality of local memories 360-363. I/O bus bridge 310 is connected to system bus 306 and provides an interface to I/O bus 312. Memory controller/cache 308 and I/O bus bridge 310 may be integrated as depicted.

Data processing system 300 is a logically partitioned data processing system. Thus, data processing system 300 may have multiple heterogeneous operating systems (or multiple instances of a single operating system) running simultaneously. Each of these multiple operating systems may have any number of software programs executing within in it. Data processing system 300 is logically partitioned such that different I/O adapters 320-321, 328-329, 336-337, and 346-347 may be assigned to different logical partitions.

Thus, for example, suppose data processing system 300 is divided into three logical partitions, P1, P2, and P3. Each of I/O adapters 320-321, 328-329, and 336-337, each of processors 301-304, and each of local memories 360-364 is assigned to one of the three partitions. For example, processor 301, memory 360, and I/O adapters 320, 328, and 329 may be assigned to logical partition P1; processors 302-303, memory 361, and I/O adapters 321 and 337 may be assigned to partition P2; and processor 304, memories 362-363, and I/O adapters 336 and 346-347 may be assigned to logical partition P3.

Each operating system executing within data processing system 300 is assigned to a different logical partition. Thus, each operating system executing within data processing system 300 may access only those I/O units that are within its logical partition. Thus, for example, one instance of the Advanced Interactive Executive (AIX™) operating system may be executing within partition P1, a second instance (image) of the AIX operating system may be executing within partition P2, and a Windows 2000™ operating system may be operating within logical partition P1.

Peripheral component interconnect (PCI) Host bridge 314 connected to I/O bus 312 provides an interface to PCI local bus 315. A number of terminal bridges 316-317 may be connected to PCI bus 315. Typical PCI bus implementations will support four terminal bridges for providing expansion slots or add-in connectors. Each of terminal bridges 316-317 is connected to a PCI I/O adapter 320-321 through a PCI Bus 318-319. Each I/O adapter 320-321 provides an interface between data processing system 300 and input/output devices such as, for example, other network computers, which are clients to server 300. Only a single I/O adapter 320-321 may be connected to each terminal bridge 316-317. Each of terminal bridges 316-317 is configured to prevent the propagation of errors up into the PCI Host Bridge 314 and into higher levels of data processing system 300. By doing so, an error received by any of terminal bridges 316-317 is isolated from the shared buses 315 and 312 of the other I/O adapters 321, 328-329, and 336-337 that may be in different partitions. Therefore, an error occurring within an I/O device in one partition is not "seen" by the operating system of another partition. Thus, the integrity of the operating system in one partition is not affected by an error occurring in another logical partition. Without such isolation of errors, an error occurring within an I/O device of one partition may cause the operating systems or application programs of another partition to cease to operate or to cease to operate correctly.

Additional PCI host bridges 322, 330, and 340 provide interfaces for additional PCI buses 323, 331, and 341. Each of additional PCI buses 323, 331, and 341 are connected to a plurality of terminal bridges 324-325, 332-333, and 342-343, which are each connected to a PCI I/O adapter 328-329, 336-337, and 346-347 by a PCI bus 326-327, 334-335, and 344-345. Thus, additional I/O devices, such as, for example, modems or network adapters may be supported through each of PCI I/O adapters 328-329, 336-337, and 346-347. In this manner, server 300 allows connections to multiple network computers. A memory mapped graphics adapter 348 and hard disk 350 may also be connected to I/O bus 312 as depicted, either directly or indirectly.

Management of logical partitions is achieved through terminals, such as hardware management consoles (HMCs). This access is provided in these examples through service processor 366, nonvolatile random access memory (NVRAM) 368, and input/output (I/O) adapter 370. Hardware management consoles connect to service processor 366 through I/O adapter 370. NVRAM 368 contains objects, such as configuration profiles used to configure and manage logical partitions within data processing system 300. In these examples, the configuration profiles which may be stored in NVRAM 368 are sent to hardware management consoles as they come online or connect to data processing system 300 through I/O adapter 370. This architecture allows for storing configuration profiles for logical partitions either at the hardware management console or NVRAM 368.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The illustrative embodiments provide a mechanism for dynamically configuring a partition with needed system resources to enable an application to run and process in a secure environment. A secure environment is an environment in which applications, transactions, or application functions may run independently and securely without interaction or accessibility by other applications, transactions, or application functions running on behalf of a user or a superuser. Any command operations in a secure environment will only reveal information that pertains to the portion that is being run and for use by the portion that is being run. For example, a postscript (ps) command to output process information on a system will only show the specific process output for the specific application, function, or transaction, and deliver that output to the specific application, function, or transaction. Thus, dynamically configuring partitions for applications that require a secure environment according the illustrative embodiments may be used to prevent other applications or users from gaining access to secure data. For instance, a superuser is a privileged user who has unrestricted access to the whole system; all commands and all files regardless of their permissions. A superuser would not have access to any information being run by the secure request. The same is true of any information gathering that is done on a deeper level, such as in the kernel debugger or other deep tracing functions.

The secure environment may be a virtual partition, dedicated partition, or dynamic partition that is configured on the hardware management console without user invention. A secure environment in which an application runs may also include an environment which is specific to a user or a group of users.

The illustrative embodiments dynamically configure a secure partition when a request for a secure environment is received from a secure application through a system call at a partition, or when a secure application is installed on the partition. When the partition management firmware in the data processing system receives such a request from an application, the partition management firmware automatically sends a partition setup command to the hardware management console. Alternatively, a partition setup command is sent to the hardware management console when an application is installed. This setup command instructs the hardware management console to create a new partition. The new partition created by the setup command is made active when needed partitioned system resources for running the application become available for use by the application. The new partition operates as a secure environment for the application by preventing other applications or users from gaining access to the data in the secure partition. Thus, the new partition provides all of the isolation advantages of a secure partition by preventing other applications from being able to peer into the application's 'private' environment. The requesting application or a portion of the application may then be executed on the new partition in the secure environment.

The illustrative embodiments also free up space allocated to the new secure partition once the application or request has completed processing. When the application has finished its processing, a specific system call may be made by the partition management firmware to inform the hardware management console to free up the space allocated to the secured partition and delete the secured partition from the hardware management console configuration.

Furthermore, the illustrative embodiments enable the creation of lightweight, short lived secure partitions. The lightweight secure partitions are short lived and allow short lived transactions to run isolated from other transactions in the system. The lightweight, short lived secure partitions are distinguishable from existing pre-created partitions, which are more long lived, permanent partitions that exist until an administrator deletes them. The illustrative embodiments may create these lightweight, short lived secure partitions ahead of time (in contrast with dynamically created partitions) to form a pre-created pool of available lightweight secure partitions. The lightweight, short lived secure partitions in the pre-created pool may then be used to process transactions without the overhead of using dynamic partition creation, which takes more time. After each transaction, the lightweight, short lived secure partitions may be flushed or reset prior to returning the secure partitions to the pre-created pool.

Furthermore, a lightweight, short lived secure partition may be preconfigured to only take resource allocations when the secure partition is enabled. Thus, the preconfigured lightweight, short lived secure partitions are also distinguishable from existing partitions in that existing partitions, once used, must wait for an administrator to delete the partition or disable the partition again. In contrast, a lightweight, short lived secure partition may be automatically flushed or reset after a transaction, rather than having to wait for a delete action to be performed by an administrator as required for existing partitions.

Figure 4:
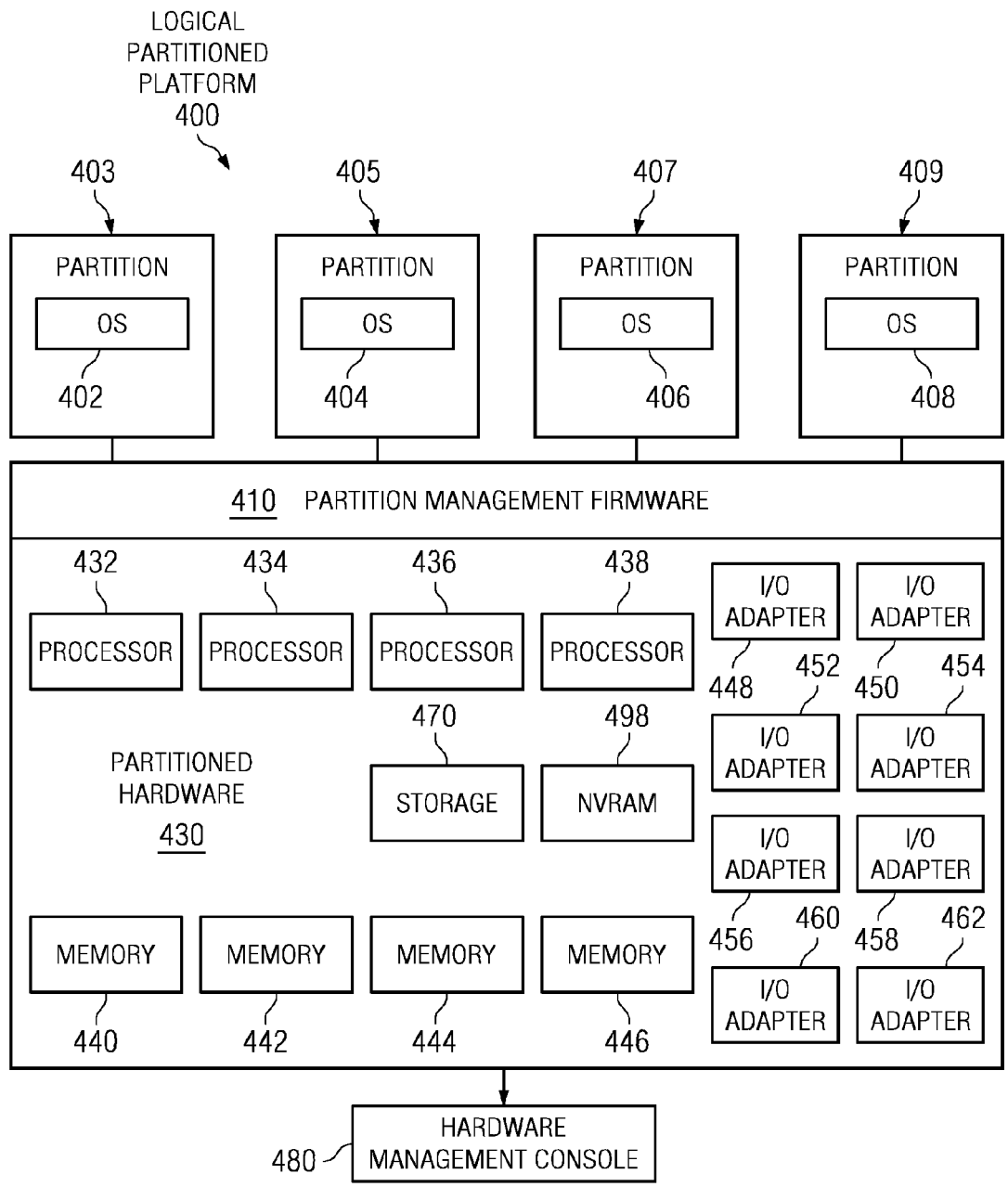
FIG. 4 is a block diagram of an exemplary logical partitioned platform in which the illustrative embodiments may be implemented.

FIG. 4 is a block diagram of an exemplary logical partitioned platform in which the illustrative embodiments may be implemented. The hardware in logical partitioned platform 400 may be implemented as, for example, data processing system 300 in FIG. 3. Logical partitioned platform 400 includes partitioned hardware 430, operating systems 402-408, and partition management firmware 410. Operating systems 402-408 may be multiple copies of a single operating system or multiple heterogeneous operating systems simultaneously run on logical partitioned platform 400.

Operating systems 402-408 are located in partitions 403-409. Hypervisor software is an example of software that may be used to implement partition management firmware 410 and performs a number of functions and services for operating systems 402-408 to create and enforce the partitioning of logically partitioned platform 400. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Partitioned hardware 430 includes a plurality of processors 432-438, a plurality of system memory units 440-446, a plurality of input/output (I/O) adapters 448-462, NVRAM storage 498, and storage unit 470. Each of processors 432-438, memory units 440-446, NVRAM storage 498, and I/O adapters 448-462 may be assigned to one of multiple partitions within logical partitioned platform 400, each of which corresponds to one of operating systems 402-408.

Partition management firmware 410 performs a number of functions and services for partitions 403-409 to create and enforce the partitioning of logical partitioned platform 400. Partition management firmware 410 is a firmware implemented virtual machine identical to the underlying hardware. Thus, partition management firmware 410 allows the simultaneous execution of independent operating system images 402-408 by virtualizing all the hardware resources of logical partitioned platform 400.

In an alternative embodiment, workload partitions (WPARs), such as an AIX™ Workload Partitions may be used in place of logical partitions 403-409. Workload partitions are software-based partitions (containers) which run on a single instance of the operating system. The containers or workload partitions allow for software partitions similar to logical partitions (LPAR) with the difference of using one instance of the operating system, rather than separate instances of the operating system. Workload partitions are usable as an alternative for logical partitions through the encapsulation of the workload partitions into a secure partition. The encapsulation will disable intrudable access into the secure environment by a superuser. However, it should be noted that while workload partitions have the capability to provide isolation utilizing software boundaries, they do not have the ability to provide a secure environment for secure portions of application or transaction processing. A secure environment differs from an isolated environment, which contains its own resources with only a limited number of specific users, where the individual or users in the group can see the environment of other users in that environment or a superuser can see and access any portion of the isolated environments. The larger zone in which the isolated zones operate in a container environment, prevent zone access by isolated zones, but does not prevent isolation by illegal entry and control of the larger zone.

As previously mentioned, management of logical partitions is achieved through hardware management console 480. Operations of the different partitions may be controlled through hardware management console 480. Hardware management console 480 is a separate data processing system from which a system administrator may perform various functions including reallocation of resources to different partitions. Hardware management console 480 configures secure partitions with the necessary hardware components, and if needed, may initiate the cloning or installation of operating systems. Hardware management console 480 may contain predefined configurations used to configure and manage logical partitions within logical partitioned platform 400. The predefined configurations may specify the particular system resources for each partition, including hardware, operating system, and software configurations. Hardware management console 480 is connected directly to logically partitioned platform 400, as illustrated in FIG. 4, or may be connected to logically partitioned platform 400 through a network, such as, for example, network 102 in FIG. 1. This hardware console may be, for example, a desktop computer, a laptop computer, or any other terminal and may be implemented using data processing system 200 in FIG. 2. Alternatively, hardware management console may be an application running in a partition in logically partitioned platform 400. Those of ordinary skill in the art will appreciate that the hardware and software depicted in FIG. 4 may vary. For example, more or fewer processors and/or more or fewer partitions may be used than those depicted in FIG. 4. The depicted example is not meant to imply architectural limitations with respect to the illustrative embodiments.

When an application installed on a partition such as partitions 403-409 needs to have a secure environment in which to run, the application makes a request for a secure environment to partition management firmware 410. Partition management firmware 410 may also be informed that a secure environment is needed by an application in response to installation of an application on a partition. The application installation process will send a system call or, through the use of an API, interact with hardware management console 480 during the installation process to synchronously or asynchronously request a creation of a secure partition. An installation menu may ask the user if a secure partition is needed or allow a configuration parameter to indicate if the application needs a secure partition to run.

Partition management firmware 410 determines from the requesting application whether the secure environment needed by the application is a dynamic partition, a virtual partition, or a logical partition. A dynamic partition is a predefined partition that specifies the minimum and/or maximum resources needed, and allows the ability to retrieve the resources from the system when the resources become available. A virtual partition is a partition that may be a fractional partition (micropartition) of existing, running partitions. The virtual partition may utilize fractions of a resource, such as the ability to run with a fraction of processor time or a whole number of processors plus a fraction of a processor. A logical partition is a system that is split into predefined logical units, where specific physical resources, such as adapters, are assigned to a specific logical partition. If the system has logical partitions defined, and unused resources, then those unused resources may be used to define another logical partition to be used for a secure partition. If a dynamic partition exists on the system, then another dynamic partition may be created, or if the system is micropartitioned, then additional virtual partitions may be created for the secure partition. If there are no resources available, and in the event the system is configured solely with logical partitions, to configure a secure partition, the application secure environment would not be able to be defined. In this situation, the system administrator would have to configure the systems initially in one of the available methods with resources available to allow for secure environment processing. In the case of dynamic or micropartitioning, a secure partition may utilize the same resources, without the need for preconfiguration, or the secure partition may be preconfigured. The application may specify that a prerequisite is for the system to be able to define secure partitions.

Based on the partition type (logical, dynamic, or virtual partition) determined, a partition setup command is automatically executed by partition management firmware 410 which instructs hardware management console 480 to create a dynamic partition, virtual partition, or logical partition. In an alternative embodiment, the command may be issued by the application through a system call to hardware management console 480. The new partition is a partition which is dynamically created and destroyed specifically for the execution of the application request. The new partition for the application is created externally from the operating system of the partition in which the application is running, be the partition a logical partition of a workload partition. Activities which may be run on the secure partition include the application processing events or transaction processing events. For example, an HTTPS transaction which requires a secure environment may run on the secure partition.

The new partition provides all of the isolation advantages of a partition which prevents other applications or users, be they root or shared users on a system, including prior instances of the application, from being able to peer into this application's secured environment. The partition by its very nature when it is created, is secure. The system through direct memory access or transfer of stack or cache information, may transfer the information directly to the secure partition. Another user or application may not access the secure partition on the system. There is no login capability or other mechanism for an application to obtain information on any other aspect of the secure partition.

The new partition is dynamically created and made active when system resources needed by the application are available to the application for execution. These system resources are allocated to the new secure partition. The system resources required by the application, such as memory 440-446, may be defined as shared, micropartition, or physical resources. Shared resources are resources that physically are used by multiple partitions, or moved between partitions as needed. Micropartition resources are resources that are a fractional slice of the physical resources. Physical resources are the hardware components, CPU, memory, registers, and I/O adapters needed to execute the software.

When the application has completed processing, the new secure partition is destroyed. The new partition is destroyed when partition management firmware 410 or the application itself (upon completion) sends a system call to hardware management console 480. The system call instructs hardware management console 480 to free up the space allocated to the secure partition by removing the secure partition from the hardware management console configuration.

Figure 5:
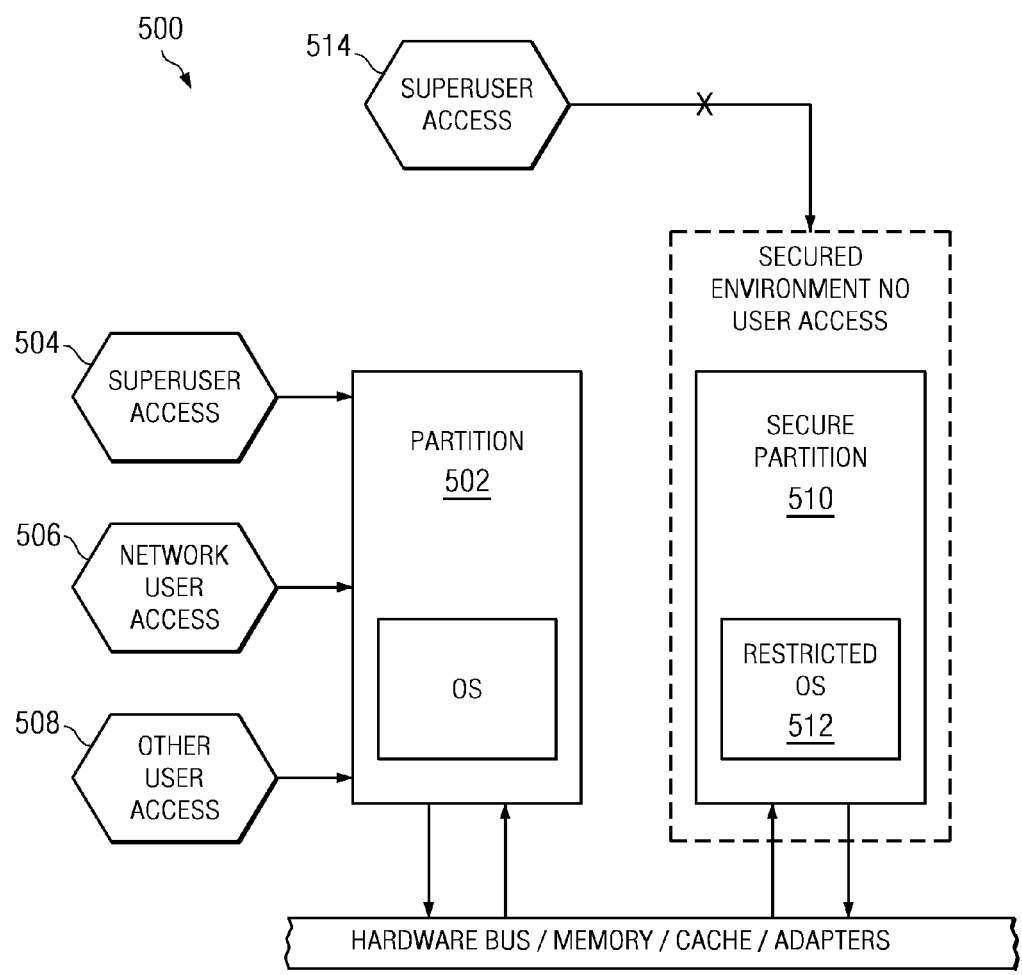
FIG. 5 is a block diagram illustrating user access to a partition and a secure partition in accordance with the illustrative embodiments.

FIG. 5 is a block diagram illustrating user access to a partition and a secure partition in accordance with the illustrative embodiments. Partition 502 is a non-secure environment. A non-secure environment is an environment in which applications running in the environment are accessible by superusers 504, network users 506, or other users 508 (e.g., users using shared or allocated resources).

Secure partition 510 comprises a secure environment which limits user access to applications running in the environment. Secure partition 510 enables applications, transactions, or application functions to run in a secure environment without accessibility by users using shared or allocated resources or by superusers, but with the ability to run functions independently and securely without interaction or accessibility by other applications, transactions or application functions running on behalf of a user or a superuser. Command operations executed by restricted operating system 512 only reveal information that pertains to and is for use by the application portion that is being run. Superuser 514 would not have access to any information being run by a secure request. The same is true of any information gathering that is done on a deeper level, such as in the kernel debugger or other deep tracing functions.

In addition, secure partition 510 may be created within a pool of secure partitions. A pre-created pool of secure partitions may be used to process transactions without the overhead of using dynamic secure partition creation. Within the pool, a short lived secure partition in the pool may be used to process one or more transactions. As secure partitions are used, the number of available pre-created secure partitions is depleted. After each transaction, the short lived secure partitions may be flushed or reset prior to returning the secure partitions to the pre-created pool. This reset process is in contrast to existing partitions which, once used, must wait for an administrator to delete the partition or disable the partition. Thus, a short lived secure partition in the pool may be automatically flushed or reset after a transaction, rather than having to wait for a delete action to be performed by an administrator as required for existing partitions.

In a pool of secure partitions, secure partitions are removed from the pool as the secure partitions are used. When the number of short lived secure partitions reaches a tunable minimum threshold, more short lived secure partitions may be created and added to the pool. Alternatively, if the number of short lived secure partitions reaches a deletion threshold (e.g., the number of short lived secure partitions existing in the pool is 0), the pool may be deleted. Consequently, any transactions may be processed in the original partition from which the secure partition was cloned, or in a dynamically created secure partition, depending upon how the system is configured.

Figure 6:
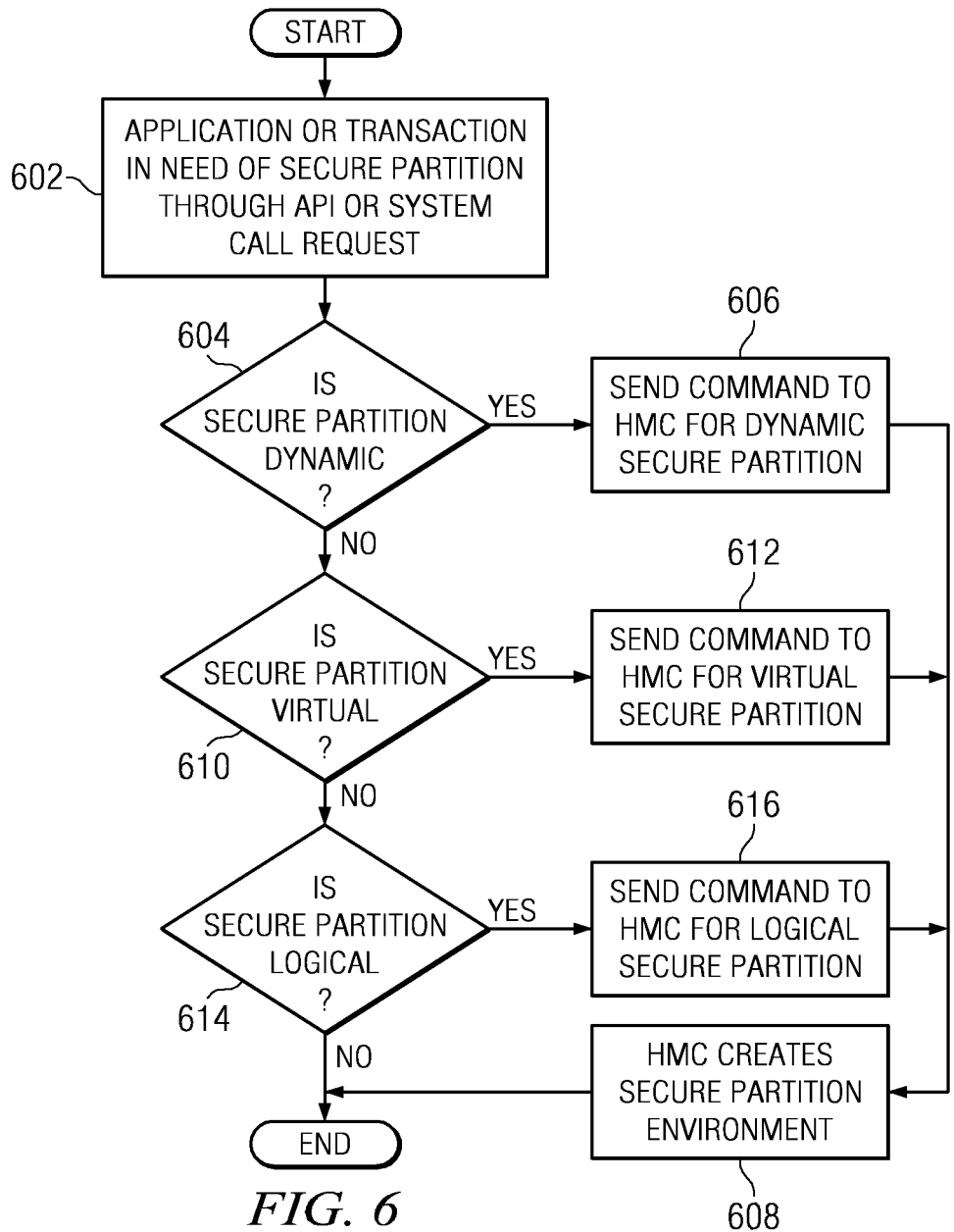
FIG. 6 is a flowchart of a process for determining a type of secure partition request in accordance with the illustrative embodiments.

FIG. 6 is a flowchart of a process for determining a type of secure partition request in accordance with the illustrative embodiments. The process described in FIG. 6 may be implemented by partition management firmware 410 in FIG. 4.

The process begins when the partition management firmware receives a system call from a secure application requesting a secure partition environment (step 602). Upon receiving the request, the partition management firmware makes a determination whether the request for a secure partition comprises a request for a dynamic secure partition (step 604). If the request for the secure partition is a request for a dynamic secure partition ('yes' output of step 604), the partition management firmware sends a command to the hardware management console to create a dynamic secure partition (step 606). The hardware management console then creates the secure partition according to the command (step 608), with the process terminating thereafter.

If the request for the secure partition is not a request for a dynamic secure partition ('no' output of step 604), the partition management firmware makes a determination whether the request for the secure partition is a request for a virtual secure partition (step 610). If the request for the secure partition is a request for a virtual secure partition ('yes' output of step 610), the partition management firmware sends a command to the hardware management console to create a virtual secure partition (step 612). The hardware management console then creates the secure partition according to the command (step 608), with the process terminating thereafter.

If the request for the secure partition is not a request for a virtual secure partition ('no' output of step 610), the partition management firmware makes a determination whether the request for the secure partition is a request for a logical secure partition (step 614). If the request for the secure partition is a request for a logical secure partition ('yes' output of step 614), the partition management firmware sends a command to the hardware management console to create a logical secure partition (step 616). The hardware management console then creates the secure partition according to the command (step 508), with the process terminating thereafter.

Turning back to step 614, if the request for the secure partition is not a request for a logical secure partition ('no' output of step 614), the process terminates thereafter.

Figure 7:
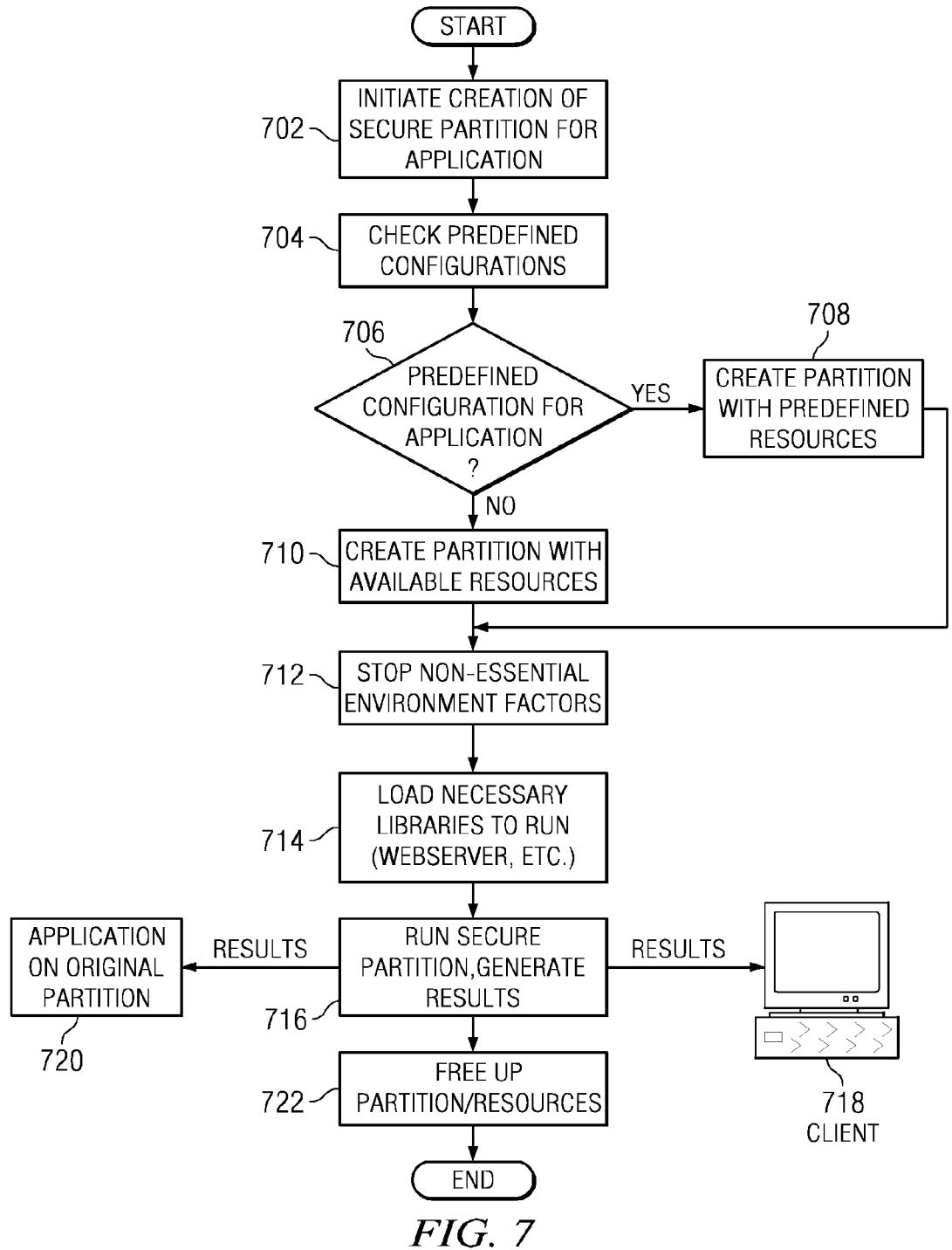
FIG. 7 is a flowchart of a process for dynamically configuring a partition with needed system resources to enable an application to run and process in a secure environment in accordance with the illustrative embodiments.

FIG. 7 is a flowchart of a process for dynamically configuring a secure partition with system resources to enable an application to run and process in a secure environment in accordance with the illustrative embodiments. The process begins with hardware management console 400 initiates the creation of a secure partition on in logical partitioned platform 400 in FIG. 4 (step 702). The secure partition created by the hardware management console may include one of partitions 403-409 in FIG. 4, and may be created in response to receiving a command from the partition management firmware to create the partition. The secure partition may be one of a dynamic partition, virtual partition, or logical partition as described in FIG. 6.

In creating the secure partition, the hardware management console first checks the predefined configurations for partitions in the logical partition platform (step 704). These predefined configurations may be located on the hardware management console. These predefined configurations specify the system resources that may be allocated to the new partition. The hardware management console then makes a determination whether there is a predefined configuration for the requesting application or transaction which is in need of the secure partition environment (step 706). If a predefined configuration for the requesting application or transaction exists ('yes' output of step 706), the hardware management console creates a partition having predefined system resources allocated to the partition which were specified in the predefined configuration (step 708). The process continues to step 712. These predefined system resources may include various hardware elements, including IP addresses, memory, CPU, network adapters, and the like.

Turning back to step 706, if a predefined configuration for the requesting application or transaction does not exist ('no' output of step 706), the hardware management console creates a partition having system resources allocated to the partition which are available to the partition (step 710). These available system resources may also include various hardware elements, including IP addresses, memory, CPU, network adapters, and the like.

The hardware management console secures the partition by stopping all non-essential environmental factors (step 712). Non-essential environmental factors may include, for example, user or other application access to the partition. In this manner, the partition may be secured by prohibiting users or other applications from accessing data in the partition. The hardware management console loads the necessary components needed to run the application in the partition on the hardware side (step 714). This step may include loading runtime libraries, a webserver, etc.

The partition restricted operating system then runs the application or a portion of the application in the secure partition (step 716) and sends the results to the requesting client (step 718). The results may be returned to the client in the event the partition is ready to send to the client the results, such as the result of an HTTPS transaction. The results in step 716 may also be returned to the application on the original partition the application was running (step 720). In order for the application to accept the results from the secure partition directly, the secure partition would have to be a clone of the partition the application came from. A clone is a true clone if it sends results back to a client from the secure partition. Every hardware or software ID that a client normally receives would be the same as in the partition the request came in. Thus, cloning masks any of the hardware or software IDs as if the application was running on the original non-secure partition, but only for the case that secure partition is sending information back directly to the client.

Once the application has completed its processing, the partitioned management firmware sends a system call to the hardware management console to free up the allocated secure partition and allocated resources, and remove the secure partition from the hardware management console configuration (step 722).

Figure 8:
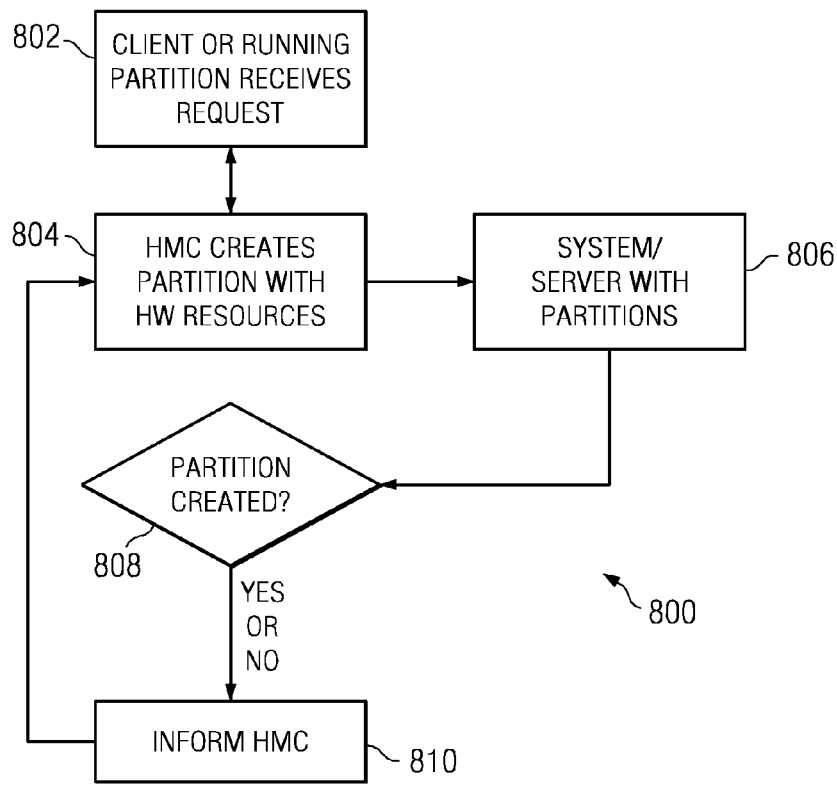
FIG. 8 is a flowchart of a process performed in a client or a running partition for determining if a hardware partition is created in accordance with the illustrative embodiments.

FIG. 8 is a flowchart of a process performed in a client or running partition for determining if a hardware partition is created in accordance with the illustrative embodiments. The process described in FIG. 8 may be implemented in a client such as client 110, 112, or 114 in FIG. 1 or partition 502 in FIG. 5. The process begins when the client or the running partition receives a request for a secure partition from an application (step 802). The client or the running partition instructs the hardware management console to create a secure partition with specific hardware resources needed to run the application (step 804). The hardware management console then creates the requested secure partition on the specified system or server (step 806). A determination is then made by the client or the running partition whether the hardware management console actually created the requested secure partition (step 808). The client or the running partition informs the hardware management console whether or not the secure partition was created (step 810). The process then loops back to step 804, where the client or running partition sends another instruction to the hardware management console to create a secure partition with specific hardware resources needed to run the application.

Figure 9:
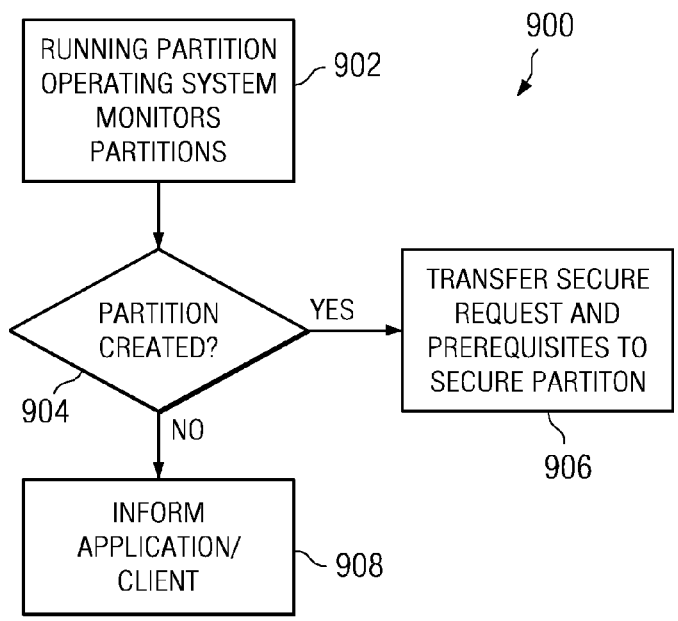
FIG. 9 is a flowchart of a process performed in a running partition operating system for transferring a secure request to a secure partition in accordance with the illustrative embodiments.

FIG. 9 is a flowchart of a process performed in a running partition operating system for transferring a secure request to a secure partition in accordance with the illustrative embodiments. The process described in FIG. 9 may be implemented in partition 502 in FIG. 5. The process begins with the running partition operating system monitoring partitions on a server (step 902). The running partition operating system makes a determination whether the hardware management console has created a secure partition on the server (step 904). If so, the running partition operating system transfers the secure request and prerequisites to the secure partition (step 906). If the hardware management console has not created a hardware partition on the server, the running partition operating system informs the application or client that no hardware partition has been created (step 908).

Figure 10:
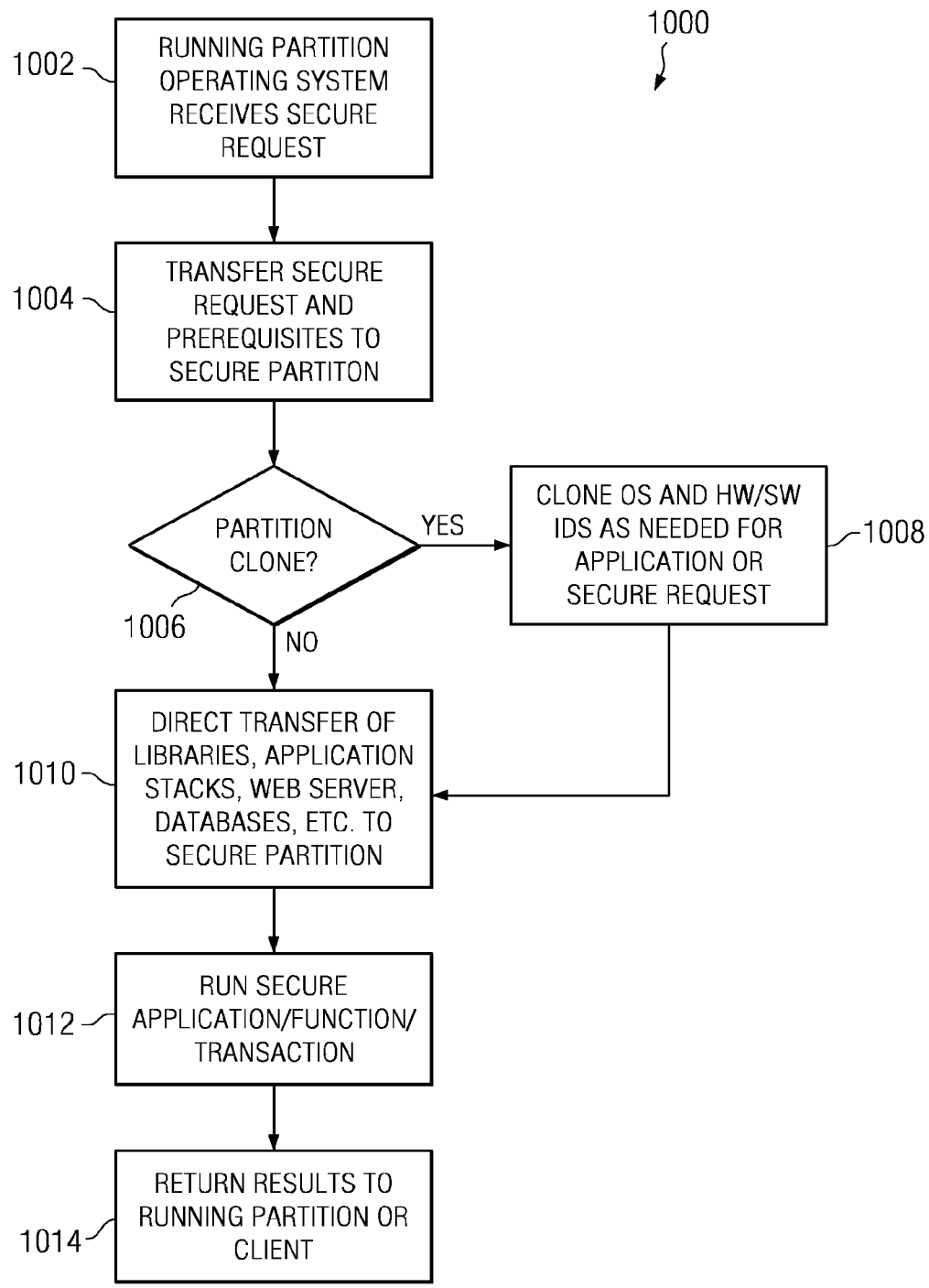
FIG. 10 is a flowchart of a process performed in a running partition operating system for cloning software components to the secure partition in accordance with the illustrative embodiments.

FIG. 10 is a flowchart of a process performed in a running partition operating system for cloning software components to the secure partition in accordance with the illustrative embodiments. In particular, FIG. 10 illustrates how hardware and software components needed to run the secure application are loaded into the secure partition by the operating system of the running partition. The process described in FIG. 10 may be implemented in partition 502 in FIG. 5. The process begins with the running partition operating system receiving the secure request when a secure partition is created (step 1002). The running partition operating system transfers the secure request and prerequisites to the secure partition (step 1004). A determination is made by the running partition operating system as to whether the created secure partition is a clone (step 1006). The operating system of the running partition transfers or clones any software component in the running partition which is needed to run the software component in the secure partition. These software components may include an application, a procedure in the application, or secure transition request that accesses some data on the system. In this manner, all of the software components needed to run in the secure partition are transferred by the software operating system on the running partition. If the created secure partition is a clone, the running partition operating system clones the operating system and the hardware and software IDs needed for the application or the secure request to run (step 1008). The process then continues to step 1010.

Turning back to step 1006, if the create secure partition is not a clone, the running partition operating system transfers the libraries, application stacks, web server, databases, and the like needed to run the application or secure request directly to the secure partition (step 1010). The running partition operating system runs the secure application, function, or transition (step 1012). The running partition operating system then returns the result of running the secure application, function, or transition to the running partition or client (step 1014).

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for configuring a short lived secure partition in a data processing system, the computer implemented method comprising:
   receiving a command to create a short lived secure partition for a secure application in response to the secure application installation process, wherein the command comprises instructions to setup one of a dynamic partition, a virtual partition, or a logical partition;
   creating the short lived secure partition in the data processing system using a hardware management console by a direct memory access or transfer of stack or cache information and transferring information directly to the secure partition;
   allocating system resources comprising physical resources and virtual allocations of the physical resources to the short lived secure partition to create a private environment for the secure application;
   allowing access to the short lived secure partition by the secure application;
   prohibiting access to the short lived secure partition by the superusers or other applications;
   loading hardware and software components needed to run the secure application in the short lived secure partition;
   creating additional short lived secure partitions to form a pool of short lived secure partitions;
   using a short lived secure partition in the pool of short lived secure partitions to process one or more transactions;
   responsive to the short lived secure partition processing a transaction, flushing the short lived secure partition before returning the short lived secure partition to the pool; determining a number of short lived secure partitions existing in the pool;
   creating more short lived secure partitions in the pool in response to the number of short lived secure partitions reaching a minimum threshold; and
   deleting the pool and using an unsecured existing partition or a dynamically created secure partition to process the one or more transactions in response to the number of short lived secure partitions reaching a deletion threshold.

2. The computer implemented method of claim 1, further comprising:
   responsive to the short lived secure application completing its processing, freeing up space allocated to the short lived secure partition and system resources.

3. The computer implemented method of claim 2, wherein the receiving, creating, allocating, loading, and freeing steps are performed by the hardware management console.

4. The computer implemented method of claim 3, wherein freeing up space allocated to the short lived secure partition includes removing the short lived secure partition from a partition configuration on the hardware management console.

5. The computer implemented method of claim 4, wherein the hardware management console frees up the space allocated to the short lived secure partition and system resources in response to receiving a system call from partition management firmware.

6. The computer implemented method of claim 1, wherein creating the short lived secure partition further comprises:
   responsive to determining that predefined partition configurations for the secure application exist, creating the short lived secure partition and allocating system resources specified in a predefined partition configuration; and
   responsive to determining that predefined partition configurations for the secure application do not exist, creating the short lived secure partition and allocating system resources available to the short lived secure partition.

7. The computer implemented method of claim 1, wherein the system resources include at least one of an Internet Protocol address, memory, central processing unit, or network adapter.

8. The computer implemented method of claim 1, wherein the command to create a short lived secure partition for a secure application is received from partition management firmware.

9. The computer implemented method of claim 8, wherein the partition management firmware sends the command when a new application is installed on a partition in the data processing system or when an application already installed on a partition sends a request for a short lived secure partition to the partition management firmware.

10. The computer implemented method of claim 1, wherein allocating system resources to the short lived secure partition includes providing portions of an operating system, encapsulating the operating system, or cloning the operating system and restricting a number of operating system access commands to run in the short lived secure partition.

11. The computer implemented method of claim 10, wherein the short lived secure partition is cloned as a copy of an unsecured existing partition, and wherein a cloned short lived secure partition is formed, and wherein hardware identifiers or software identifiers obtained from the unsecured existing partition are masked in the cloned short lived secure partition to respond only to secure requests, and wherein a result is only returned to a client in an event the cloned short lived secure partition is ready to send to the client the result or to an application on an original partition on which the application was running.

12. The computer implemented method of claim 1, wherein the short lived secure partition comprises a partition which is automatically flushed or reset after the transaction.

13. The computer implemented method of claim 1, wherein the superusers comprise privileged users who have unrestricted access to the data processing system as a whole.

14. A data processing system for configuring a short lived secure partition in a data processing system, the data processing system comprising:
   a bus;
   a storage device connected to the bus, wherein the storage device contains computer usable code;
   at least one managed device connected to the bus;

a communications unit connected to the bus;
a hardware management console; and
a processing unit comprising one or more hardware processor and connected to the bus configured to:
receive a command to create a short lived secure partition for a secure application in response to the secure application installation process, wherein the command comprises instructions to setup one of a dynamic partition, a virtual partition, or a logical partition;
create the short lived secure partition in the data processing system using the hardware management console by a direct memory access or transfer of stack or cache information and transferring information directly to the secure partition;
allocate system resources comprising physical resources and virtual allocations of the physical resources to the short lived secure partition to create a private environment for the secure application;
allow access to the short lived secure partition by the secure application;
prohibit access to the short lived secure partition by the superusers or other applications;
load hardware and software components needed to run the secure application in the short lived secure partition;
create additional short lived secure partitions to form a pool of short lived secure partitions;
use a short lived secure partition in the pool of short lived secure partitions to process one or more transactions;
responsive to the short lived secure partition processing a transaction, flush the short lived secure partition before returning the short lived secure partition to the pool; determine a number of short lived secure partitions existing in the pool;
create more short lived secure partitions in the pool in response to the number of short lived secure partitions reaching a minimum threshold; and
delete the pool and use an unsecured existing partition or a dynamically created secure partition to process the one or more transactions in response to the number of short lived secure partitions reaching a deletion threshold.

15. A non-transitory computer usable medium having computer usable program code embodied thereon executed by one or more processor causes the one or more processor to perform a set of steps, the steps comprising:
receiving a command to create a short lived secure partition for a secure application in response to the secure application installation process, wherein the command comprises instructions to setup one of a dynamic partition, a virtual partition, or a logical partition;
creating the short lived secure partition in the data processing system using a hardware management console by a memory access or transfer of stack or cache information and transferring information directly to the secure partition;
allocating system resources comprising physical resources and virtual allocations of the physical resources to the short lived secure partition to create a private environment for the secure application;
allowing access to the short lived secure partition by the secure application;
prohibiting access to the short lived secure partition by the superusers or other applications;
loading hardware and software components needed to run the secure application in the short lived secure partition;
creating additional short lived secure partitions to form a pool of short lived secure partitions;
using a short lived secure partition in the pool of short lived secure partitions to process one or more transactions;
responsive to the short lived secure partition processing a transaction, for flushing the short lived secure partition before returning the short lived secure partition to the pool;
determining a number of short lived secure partitions existing in the pool;
creating more short lived secure partitions in the pool in response to the number of short lived secure partitions reaching a minimum threshold; and
deleting the pool and using an unsecured existing partition or a dynamically created secure partition to process the one or more transactions in response to the number of short lived secure partitions reaching a deletion threshold.

16. The computer program product of claim 15, further comprising:
computer usable program code for freeing up space allocated to the short lived secure partition and system resources in response to the short lived secure application completing its processing.

17. The computer program product of claim 15, wherein the computer usable program code for allocating system resources to the short lived secure partition includes computer usable program code for providing portions of an operating system, computer usable program code for encapsulating the operating system, or computer usable program code for cloning the operating system and restricting a number of operating system access commands to run in the short lived secure partition, and wherein the short lived secured partition is cloned as a copy of an existing partition, wherein a cloned short lived secured partition is formed, and wherein hardware identifiers or software identifiers obtained from the existing partition are masked in the cloned short lived secured partition to respond only to secure requests, and computer usable program code for only return a result to a client in an event the cloned short lived secure partition is ready to send to the client the result or to an application on an original partition on which the application was running.

18. The computer program product of claim 15, further comprising:
computer usable program code for creating additional short lived secure partitions to form a pool of short lived secure partitions;
computer usable program code for using a short lived secure partition in the pool of short lived secure partitions to process the one or more transactions; and
computer usable program code for flushing the short lived secure partition before returning the short lived secure partition to the pool in response to the short lived secure partition processing the transaction.

* * * * *